United States Patent
Stefanini et al.

(10) Patent No.: US 9,140,412 B2
(45) Date of Patent: Sep. 22, 2015

(54) METHOD AND APPARATUS FOR TREATING FLUID IN A CONDUIT WITH RADIO-FREQUENCIES

(75) Inventors: Daniel Stefanini, Nottingham (GB); Denzil Rodrigues, Nottingham (GB)

(73) Assignee: HYDROPATH TECHNOLOGY LIMITED, Nottingham (GB)

( * ) Notice: Subject to any disclaimer, the term of this patent is extended or adjusted under 35 U.S.C. 154(b) by 103 days.

(21) Appl. No.: 13/881,419

(22) PCT Filed: Oct. 28, 2011

(86) PCT No.: PCT/GB2011/052106
§ 371 (c)(1),
(2), (4) Date: Jun. 25, 2013

(87) PCT Pub. No.: WO2012/056248
PCT Pub. Date: May 3, 2012

(65) Prior Publication Data
US 2013/0269810 A1   Oct. 17, 2013

(30) Foreign Application Priority Data

Oct. 28, 2010   (GB) .................................. 1018236.8

(51) Int. Cl.
*F17D 1/20* (2006.01)
*C02F 1/48* (2006.01)
*B01J 19/12* (2006.01)

(52) U.S. Cl.
CPC .................. *F17D 1/20* (2013.01); *B01J 19/129* (2013.01); *C02F 1/485* (2013.01); *B01J 2219/0877* (2013.01); *C02F 1/487* (2013.01)

(58) Field of Classification Search
USPC .............. 210/222, 695, 243, 223, 748.01, 97, 210/143, 232, 742, 748.02, 748, 96, 87; 422/186, 22, 906; 204/660, 554, 570, 204/571, 665; 166/369, 304, 75; 219/628, 219/630, 662; 336/181, 182; 427/244, 11
See application file for complete search history.

(56) References Cited

U.S. PATENT DOCUMENTS

| 6,292,085 | B1* | 9/2001 | Cho | 210/222 |
| 8,029,669 | B2* | 10/2011 | Stefanini | 210/222 |
| 8,033,334 | B2* | 10/2011 | Stefanini | 166/304 |

FOREIGN PATENT DOCUMENTS

| EP | 0720588 B1 | 2/1999 |
| EP | 2 239 052 A2 | 10/2010 |
| WO | 91/05971 | 5/1991 |
| WO | 97/36828 | 10/1997 |

* cited by examiner

*Primary Examiner* — Krishnan S Menon
*Assistant Examiner* — Waqaas Ali
(74) *Attorney, Agent, or Firm* — Kirschstein, et al.

(57) ABSTRACT

Apparatus for treating a fluid in a conduit by the application thereto of radio-frequency electro-magnetic signals, includes a core element of magnetically-permeable material extending around the conduit, and one or more primary coils through which the core element extends and is energized with radio-frequency electrical signals by at least one signal generator; wherein at least one of the primary coils has an extent and/or disposition circumferentially of the core element and the conduit such as to establish an effective magnetic field throughout the core element.

6 Claims, 3 Drawing Sheets

METHOD AND APPARATUS FOR TREATING FLUID IN A CONDUIT WITH RADIO-FREQUENCIES This invention relates to a method and apparatus for treating a fluid contained in a conduit, by the application thereto of radio-frequency electro-magnetic signals.

One way in which such application of signals to fluid in a conduit can be carried out is disclosed in patent EP 0720588B. That patent discloses an arrangement wherein an element termed a core, analogous to the core of a transformer, of magnetically-permeable material such as a suitable ferrite, is provided on the external surface of a conduit such as a pipe, extending circumferentially therearound. At one position on the circumferentially extending core element, a primary coil or winding of an electrical conductor is provided with the core element extending through the primary coil. The primary coil is electrically energised with radio frequency signals. The conduit with the fluid therein acts as the secondary of the transformer, and in the fluid an electromagnetic field is created having substantially circular magnetic flux lines in substantially co-axial relationship with the axis of the conduit. The field propagates along the direction of the axis, to treat the fluid upstream and downstream of the primary coil and core element.

As disclosed in EP 0720588B, the core may be constituted by a number of individual components of or carrying the ferrite material, secured together to provide a magnetically-conductive assembly which completely circumscribes the conduit and passes through the primary coil.

One problem which can arise when apparatus as above described is applied to a conduit such as a pipe of large diameter, and correspondingly large circumference, is that the magnetic field inside the ferrite core decays with increasing distance around the conduit from the primary coil, and the correct level of magnetic field is not established around the entire circumference of the pipe.

The decay of the magnetic field away from the primary is of generally exponential form, so as the pipe size increases, the decay of the field rapidly becomes so great that it is insufficient to create the correct electric field in order to treat the pipe and the fluid contained therein.

The problem is even more acute where the core element is defined by a number of physically-separate components of magnetically-permeable material secured to one another to extend around the pipe. Even if apparently good contact between the elements is achieved, e.g. by securing them to one another in such a way that facing surfaces of the individual elements are clamped together with no apparent reduction in the cross-sectional area of the core element as a whole, there is still a local reduction in the permeability of the core element, so that in a core element with a number of individual components there may be a greatly-reduced magnetic flux in a region of the core element remote from the position of the primary core element.

This problem can be partially ameliorated by increasing the cross-sectional area of the magnetic core to increase the effective permeability and provide a lower resistance path for the magnetic field. However, increasing the cross-sectional area of the core can affect how quickly the field decays, but it will always decay exponentially away from the primary—the exponential decay will quickly overwhelm the (non-exponential) benefit of increased area. This means that this approach has two major problems: first, pipes beyond a given size are essentially untreatable; secondly, even for pipes that can be treated the volume and mass of ferrite needed to ensure sufficient flux around a large pipe rapidly becomes so large as to be completely impractical (the necessary weight can run into tonnes for a two-meter diameter pipe).

With the object of addressing the problem of large pipes, and in order that there is a sufficient level of magnetic field present throughout the core, the present invention provides that, rather than simply applying an electric field at one point or small region around the circumference of the core, which then decays away from the primary, an electric field is applied at an extended region, e.g. at more than a single point, around the core.

Thus the present invention provides that at least one primary coil has an extent circumferentially of the core element around the conduit and/or a respective disposition in relation to the core element as to establish an effective magnetic field throughout the entire core element.

There may be two or more of the primary coils through which the core element extends, the primary coils being spaced from one another circumferentially of the conduit and energised with radio-frequency electrical signals which are synchronised with one another.

Thus, in order that there is a sufficient level of magnetic field present throughout the core, rather than simply applying an electric field at one point around the circumference of the core, which then decays away from the primary, an electric field is applied at more than a single point around the core.

Alternatively, or additionally, the, or at least one, primary coil may extend around a greater portion of the length of the core element circumferentially of the conduit, so that the portion of the core element away from the or each primary coil is relatively reduced. In this way, fewer primary coils but of greater extent may maintain the magnetic field in the core element as effectively as a greater number of primary coils but of lesser extent. Possibly, even, a single primary coil could extend around the entire or substantially the entire length of the core element circumferentially of the conduit.

The number of primary coils provided in accordance with the invention can be selected in accordance with the length of the core element as a whole, circumferentially of the conduit. Preferably the primary coils are spaced substantially equally from one another around the circumferential length of the core element.

It is envisaged that apparatus in accordance with the invention when utilised with a conduit in the form of a pipe whose diameter is 1-2 m may be provided with three, four, or possibly more primary coils, spaced circumferentially around the core element. A smaller pipe may require only two primary coils, disposed, for instance, diametrically opposite one another with respect to the pipe. Two coils of greater extent may be used instead of three coils of lesser extent.

The radio frequency signals energising the primary coils may have a frequency in the range 50 khz to 500 khz, for example, with waiting states (no signal) of random length between successive radio frequency signals. Each radio frequency signal may be a "ringing" signal, of sinusoidal or possibly other wave form, and variable amplitude diminishing from a maximum value to zero before another signal is supplied after the waiting period.

The necessary synchronisation of the radio frequency signals in the respective primary coils may be achieved by energisation thereof by a signal generator common to the primary coils. Alternatively, the primary coils may be energised by respective signal generators each of which energises one or more of the primary coils, the signal generators being arranged to produce the same signals as one another when caused to do so by a triggering device common to the signal generators. In this case, the random intervals between the signals may be provided by the triggering device.

The invention also provides a method of treating a fluid in a conduit, by use of the above-described apparatus.

The invention will now be described by way of example with reference to the accompanying drawings, of which:

Figure 1:
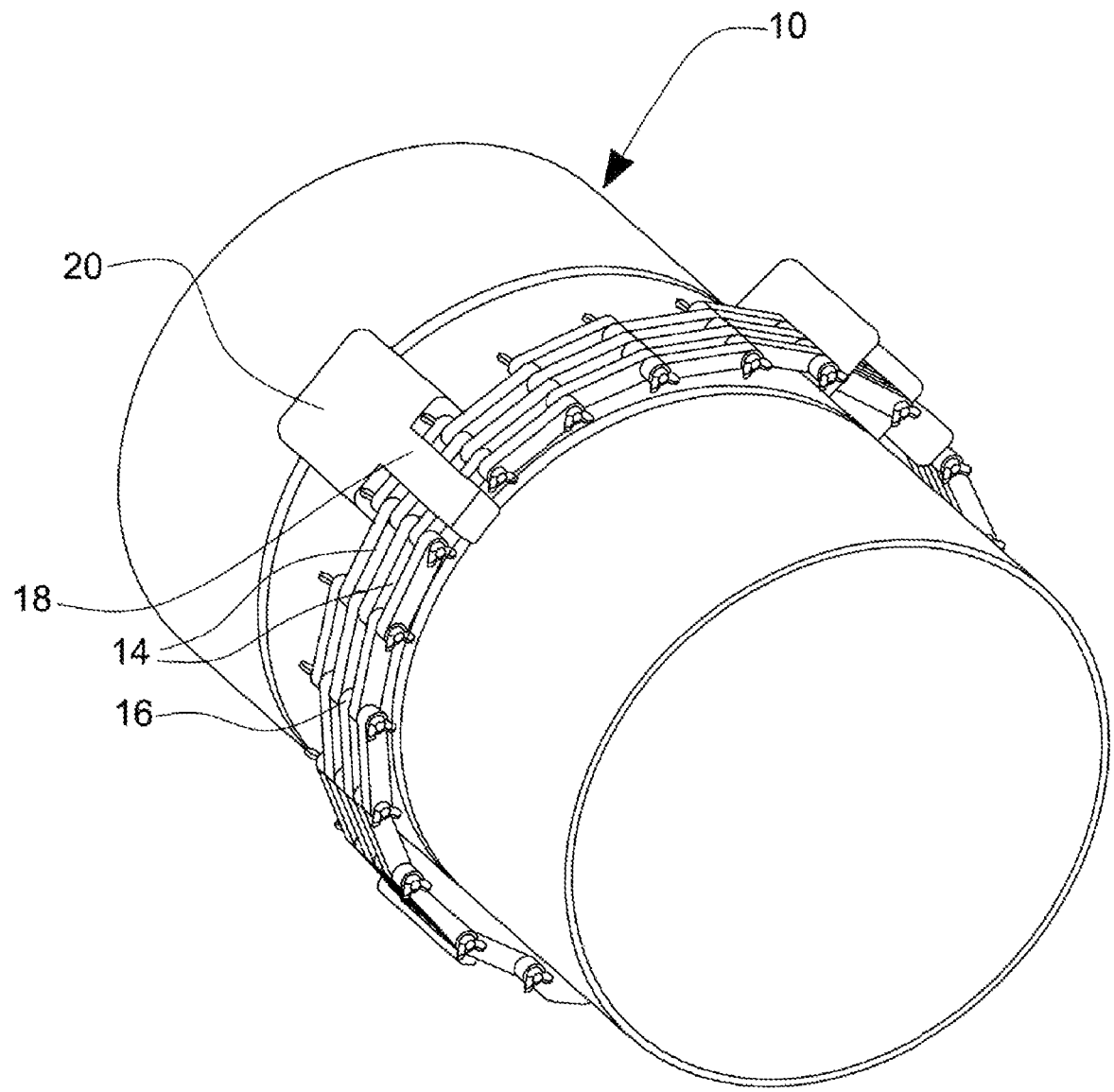
FIG. 1 is a perspective view of apparatus in accordance with the invention, applied to a conduit in the form of a pipe.
Figure 2:
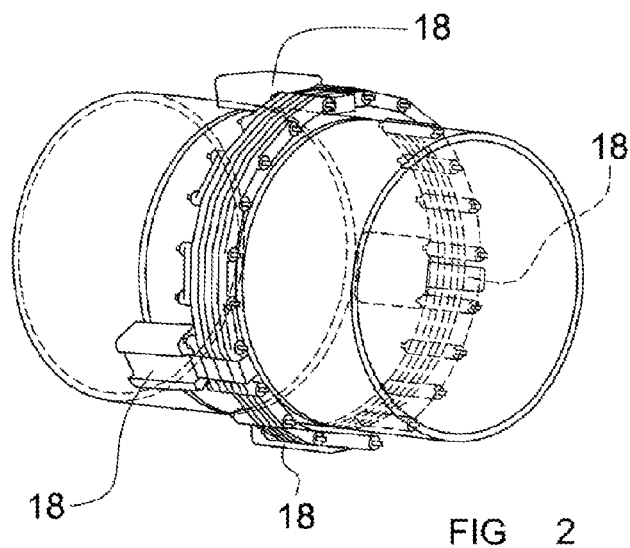
FIG. 2 is a view as FIG. 1, with components not visible in FIG. 1 shown in broken lines.
Figure 5:
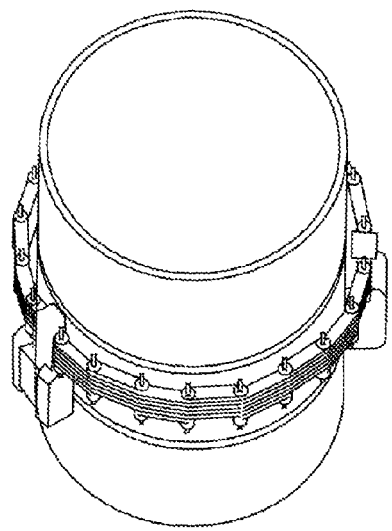
FIGS. 3 to 6 are further perspective views of the apparatus, from different angles.
Figure 3:
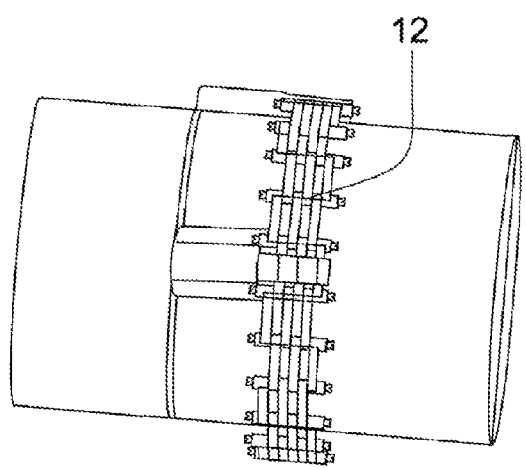
Figure 4:
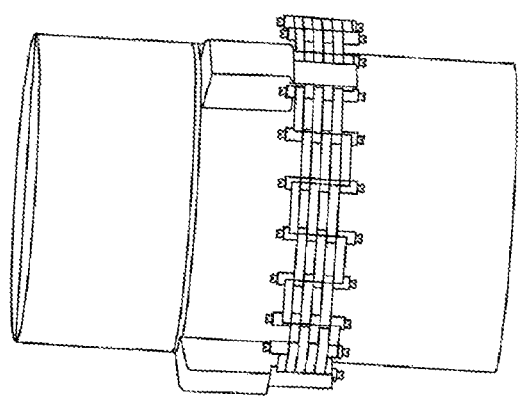
Figure 6:
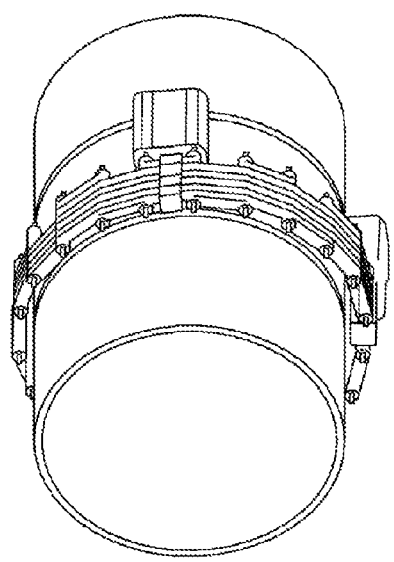

Referring to the drawings, a conduit in the form of a pipe is indicated generally at 10. It is encircled by a core element of magnetically-permeable material, 4 made from a plurality of individual components of such material secured to one another, as described below.

As illustrated, the core element, indicated generally at 12, comprises a plurality of components 14 secured to one another. In the illustrated embodiment, each component 14 is in the form of a short bar which has apertures at its ends. The components 14 are secured to one another in a chain-like structure, each three of such components which lie alongside one another being secured at their respective first ends to a further three intercalated such components, by a fastening bolt (indicated at 16) extending through the end apertures of the first mentioned three components and the second mentioned three components. The first mentioned components are secured to yet another three components at their second, opposite, ends by a further bolt, and so on around the entire external circumference of the pipe 10. Hence, a magnetically-permeable assembly encircles the pipe 10.

In FIGS. 2-6, the core element 12 is provided with four primary coils, indicated at 18, spaced circumferentially around the pipe at substantially equal distances from one another. Each primary coil extends from a casing 20, and the core element adjacent passes through the primary coil. Hence, an electrical signal in each coil 18 causes the establishment in the core element of a magnetic flux. Electrical signals which energise the primary coils 18 are preferably radio frequency signals, of "ringing" wave form as described above with random length waiting periods of no signal therebetween. The casing 20 of each primary coil may contain the necessary electronic components to constitute a signal generator for producing such signals. Since the production of such signals is well known to those skilled in the field of electrical and electronic devices, it will not be described herein in detail.

The number of primary coils to be applied to the core can be determined as follows. In order to apply an adequate electric field to the pipe, the magnetic field through the core must be of a sufficient level around its entire circumference. The magnetic field starts at a maximum next to the first primary coil, and decays away exponentially as a function of distance from the primary. Strictly speaking, the field at a given point is the sum of two exponentials, each decaying with increasing distance away from a primary in each direction around the core, and therefore the functional form of the field is more like a hyperbolic cosine, but this approximates to "exponential" decay. The second primary coil should be placed at an appropriate distance so that there is an adequate magnetic field in the core at all points between the two primaries. This is then repeated for the additional primaries, and it is this required spacing that determines the correct number of primaries for a given core. Practically speaking, the most efficient placing will be to place the multiple primaries so they are equally spaced around the circumference of the core.

It is necessary that the signals applied to the primary coils 18 are synchronised with one another. As mentioned above, the radio frequency signals applied to the primary coils may have a frequency in the range 50 khz to 500 khz, of sinusoidal, or possibly other wave form, and variable amplitude. The signals may be "ringing" signals, whose amplitude varies within an envelope which diminishes from a maximum value to zero before a further signal is applied after a waiting period. Such signals applied to the primary coils need to be synchronised in respect both of the envelope thereof and the underlying radio-frequency wave form. If the envelope functions are not synchronised, the core will not be fully energised and the pipe will not get an adequate electric field applied. However, it is even more important to ensure that the underlying radio-frequency wave forms are synchronised, i.e. in phase. If they are out of phase, then one primary can be applying a positive electric field at the same time as another is applying a negative electric field. The two fields will then cancel, and the total field applied by two primaries will actually be less than that applied by one. Indeed, if completely out of phase, the two fields can cancel completely.

To achieve this, a signal generator common to all the primary coils may apply an output signal to all the primary coils. Alternatively, signal-generating components may be associated with each of the primary coils, but they may be brought into synchronism with one another by the use of a triggering device which causes all the signal generators to produce the same signal in phase with one another, at the same time.

It should be noted that a single "one-time" triggering pulse will not be adequate. Although all the primaries may be nominally identical, there will be minor differences in the components due to natural variation. This variation will mean that the primary units will always have some variation in frequency, and hence will tend to drift out of phase over time. The triggering pulse will need to be repeated at intervals to ensure that the units do not drift significantly out of phase.

The above requirements imply two major criteria for the timing pulse. The first is that the pulse is repeated on a timescale short compared to the phase-drift time of the primaries. The second is that the accuracy with which the timing is imparted to each primary has a small variation in time compared to the period of the underlying radio-frequency signal. Thus the required accuracy of the synchronisation is determined by the radio frequency signal, and not the envelope function.

Figure 7A:
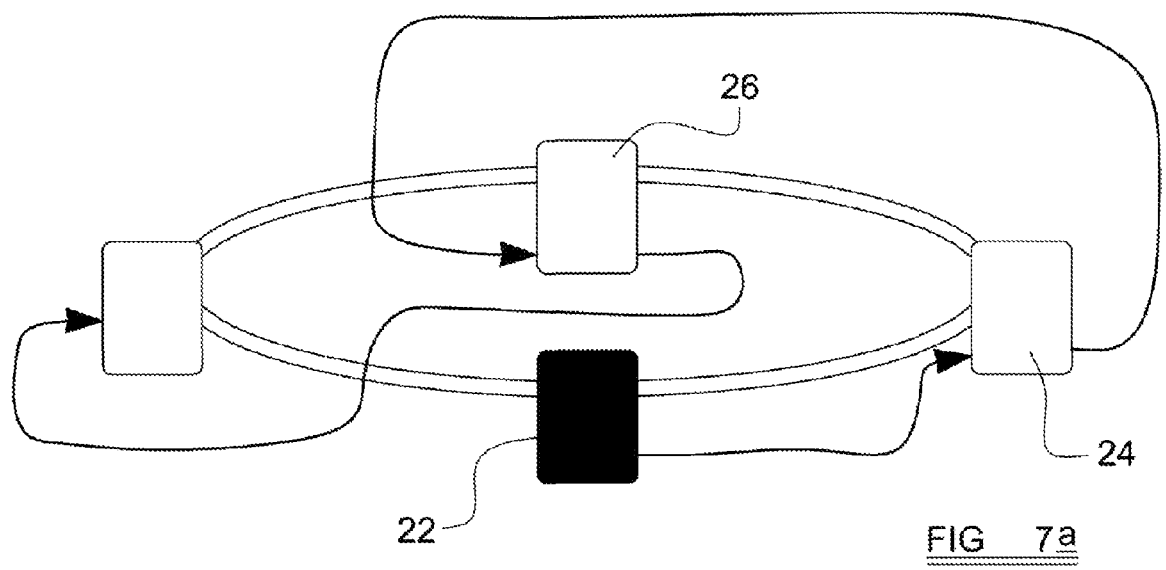
FIGS. 7a and 7b illustrate arrangements for synchronising the signals applied to the primary coils.
Figure 7B:
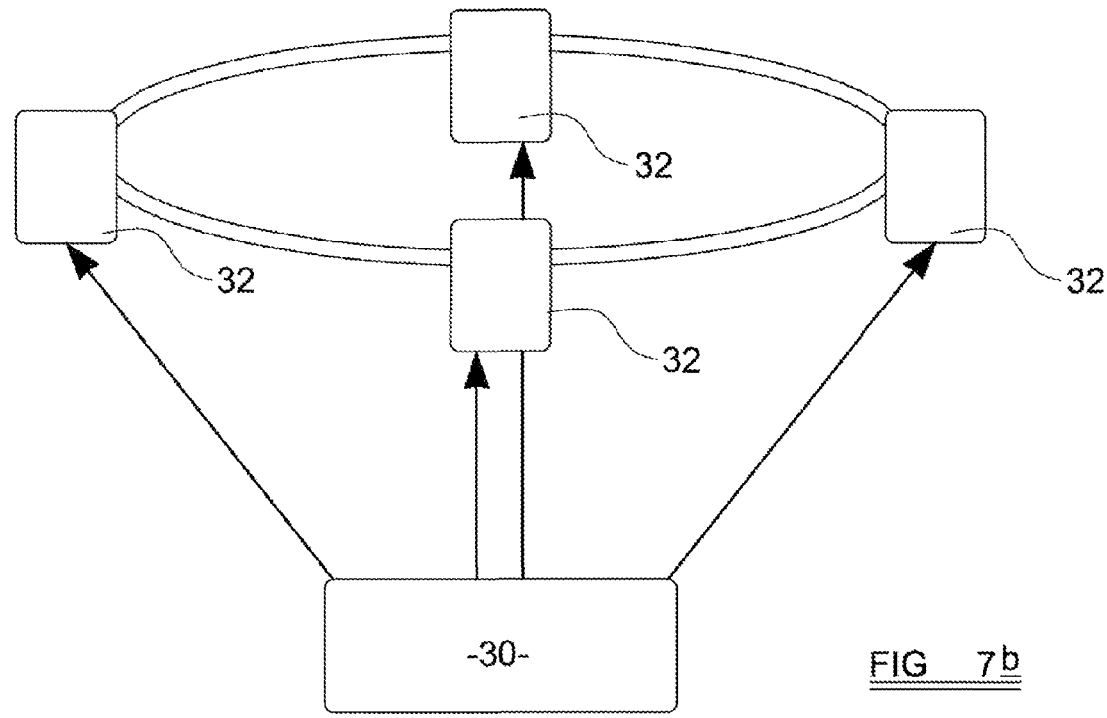

The triggering mechanism may be arranged in any convenient way. One example is a master-and-slave arrangement shown in FIG. 7a, in which one unit 22 produces both a signal to be applied to the primary, and a triggering signal or "clock pulse" which is then passed to a second unit 24. The clock pulse is used by the second unit to ensure that the signals it produces are synchronised with the first. As noted, this pulse must be more accurate than the radio oscillation period, and repeat before the radio signals drift out of phase. The second unit 24 can then transfer the pulse to the third 26, and so on. An alternative method is to have a separate device 30 which produces a clock pulse itself, which is then transmitted to signal generators within the multiple units 32 associated with the respective primary coils. The above mentioned criteria for the pulse must still apply.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An apparatus for treating a fluid contained in a conduit by the application thereto of radio-frequency electro-magnetic signals, comprising:
   a core element of magnetically-permeable material extending around the conduit;
   at least two primary coils through which the core element extends, the primary coils being spaced from one another circumferentially from the conduit; and
   at least one signal generator providing signals for energizing the primary coils with radio-frequency electrical signals, the electrical signals being synchronized with one another.

2. The apparatus according to claim 1, wherein the primary coils are spaced substantially equally from one another around the circumferential length of the core element.

3. The apparatus according to claim 1, comprising three, four, or more primary coils.

4. The apparatus according to claim 1, wherein the radio-frequency signals have a frequency in the range from 50 kHz to 500 kHz.

5. The apparatus according to claim 1, wherein each radio-frequency signal is of variable amplitude, diminishing from a maximum value to zero prior to the application of another signal after a random waiting period.

6. The apparatus according to claim 1, wherein the at least two primary coils are energized by respective signal generators, each of which energizes a respective primary coil, the signal generators being synchronized in operation by a triggering device common thereto.

* * * * *